US006649924B1

(12) United States Patent
Philipp et al.

(10) Patent No.: US 6,649,924 B1
(45) Date of Patent: Nov. 18, 2003

(54) OPTOELECTRONIC MEASURING DEVICE

(75) Inventors: Harald Philipp, Wegersfeld (AT); Ernst Winklhofer, St. Johann Ob Hohenburg (AT); Martin Baumgartner, Graz (AT)

(73) Assignee: AVL List GmbH, Graz (AT)

( * ) Notice: Subject to any disclaimer, the term of this patent is extended or adjusted under 35 U.S.C. 154(b) by 168 days.

(21) Appl. No.: 09/670,614

(22) Filed: Sep. 27, 2000

(30) Foreign Application Priority Data

Sep. 28, 1999 (AT) .............................. 671/99 U

(51) Int. Cl.⁷ ................................. G01J 5/00
(52) U.S. Cl. ................... 250/554; 250/227.28
(58) Field of Search ........................ 250/554, 227.2, 250/227.11, 227.24, 227.28; 73/35.01, 35.07, 116; 356/241.1, 241.5, 241.6

(56) References Cited

U.S. PATENT DOCUMENTS

| 3,978,720 A | | 9/1976 | Ford ........................ 73/116 |
| 4,393,687 A | | 7/1983 | Müller et al. .............. 73/35.07 |
| 4,422,321 A | | 12/1983 | Müller et al. .............. 73/35.01 |
| 4,446,723 A | | 5/1984 | Böning et al. ............. 374/14 |
| 4,452,072 A | * | 6/1984 | Damson et al. ............ 73/116 |
| 4,506,186 A | | 3/1985 | Damson et al. ............ 313/129 |
| 4,752,127 A | * | 6/1988 | Zafred ..................... 356/241.1 |
| 5,109,459 A | * | 4/1992 | Eibert et al. ................ 385/115 |
| 5,384,467 A | * | 1/1995 | Plimon et al. .............. 250/554 |
| 5,828,797 A | * | 10/1998 | Minott et al. ................ 385/12 |

FOREIGN PATENT DOCUMENTS

| AT | 002228 | 6/1998 | .......... H01T/13/48 |
| DE | 3700731 | 7/1987 | .......... G01N/21/84 |
| EP | 0325917 | 1/1989 | .......... G01J/5/08 |
| EP | 0593413 | 10/1993 | .......... G01J/5/08 |

* cited by examiner

Primary Examiner—David V. Bruce
Assistant Examiner—Courtney Thomas
(74) Attorney, Agent, or Firm—Dykema Gossett PLLC

(57) ABSTRACT

An optoelectronic measuring device for monitoring combustion processes in the combustion chamber of an internal combustion engine during operation includes optical sensors assigned to the combustion chamber and connected to an evaluation unit, the sensor ends on the side of the combustion chamber being essentially positioned in a plane and the sensors being aligned so that the individual viewing angles of the sensors will uniformly cover at least one predefined measuring sector of the combustion chamber. A simple way of localizing the origin of engine knocking in the combustion chamber is ensured by positioning the optical sensors in an essentially cylindrical component projecting into the combustion chamber with the sensor ends positioned essentially radially along the wall of the component.

35 Claims, 3 Drawing Sheets

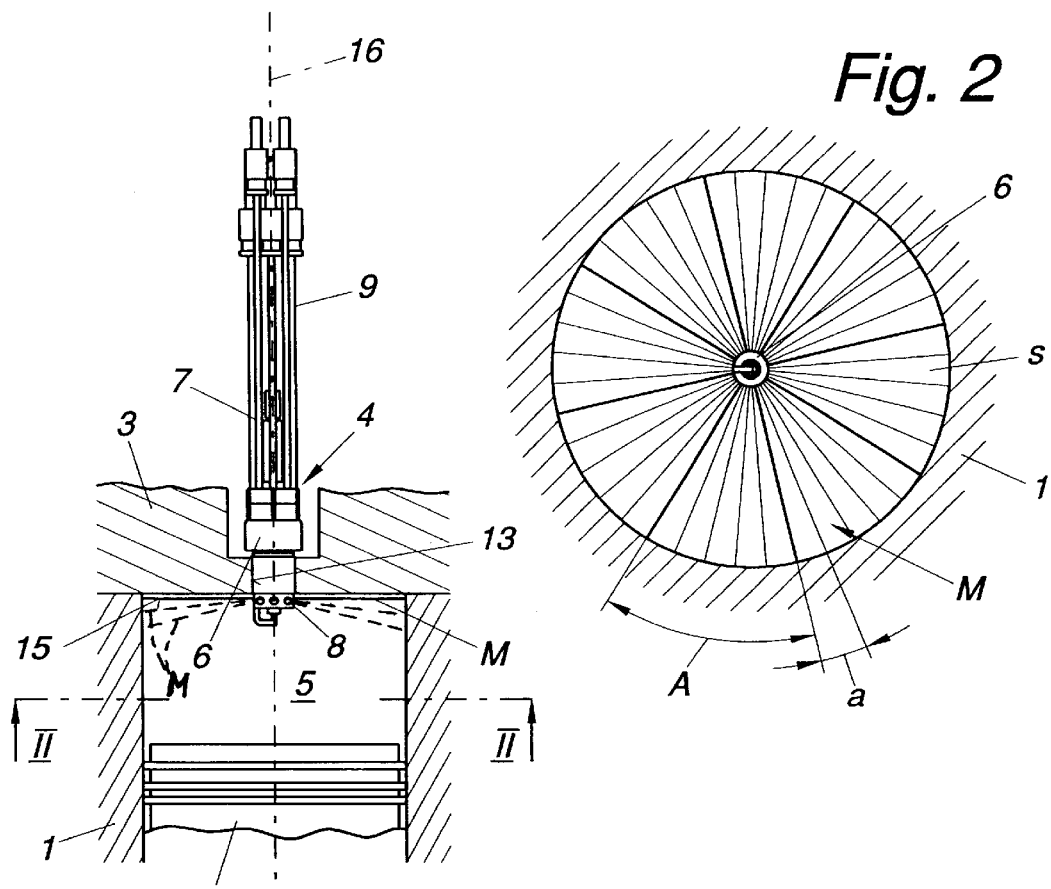
*Fig. 2*
*Fig. 1*
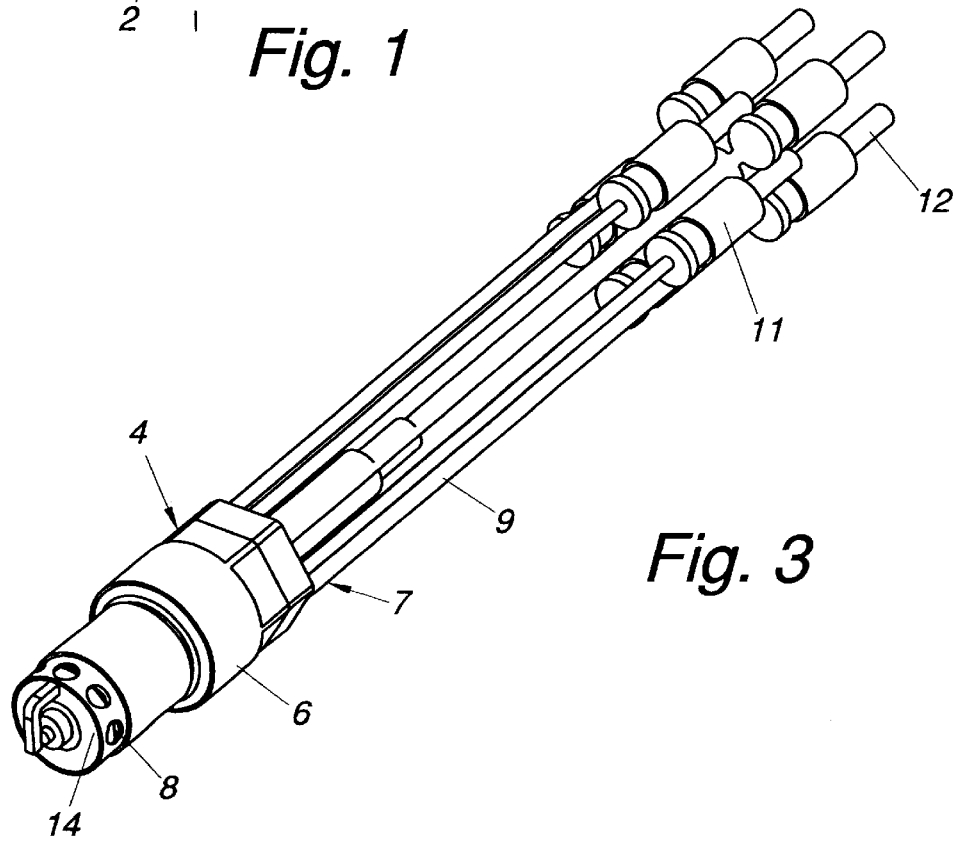
*Fig. 3*

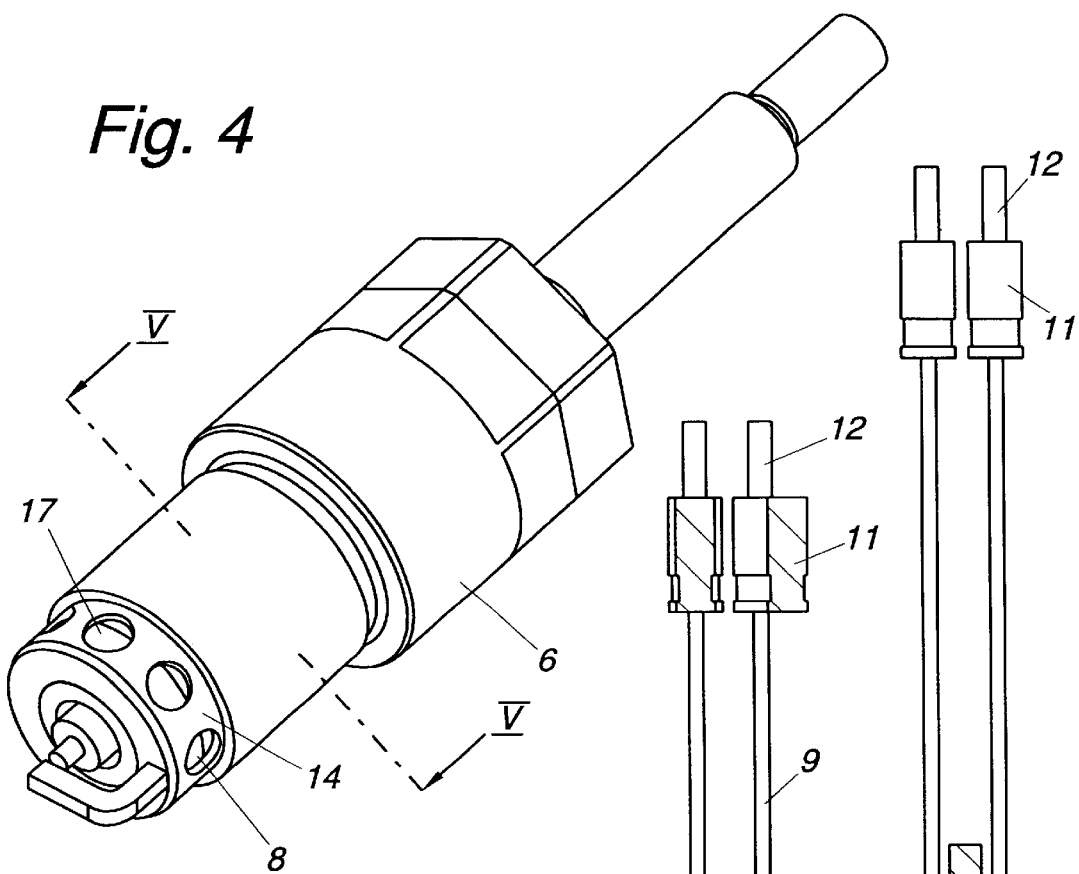
Fig. 4
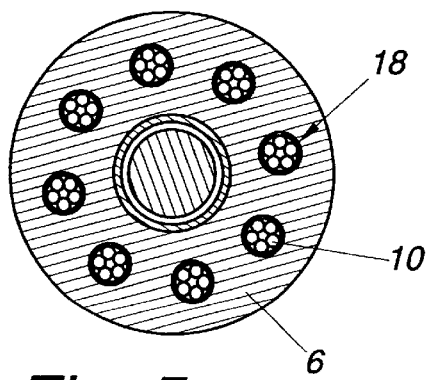
Fig. 5
Fig. 6
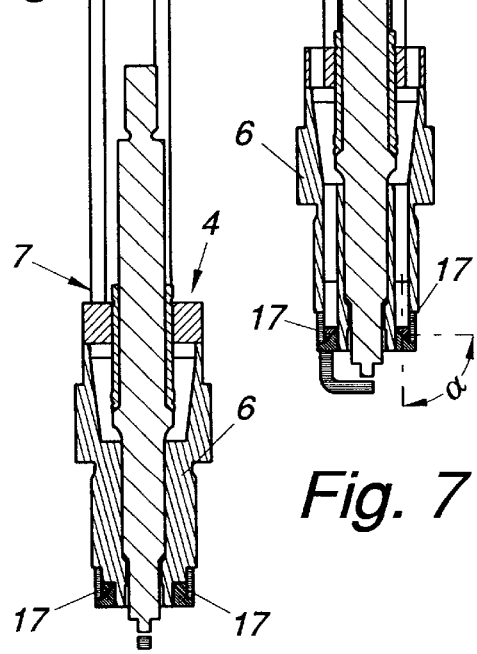
Fig. 7

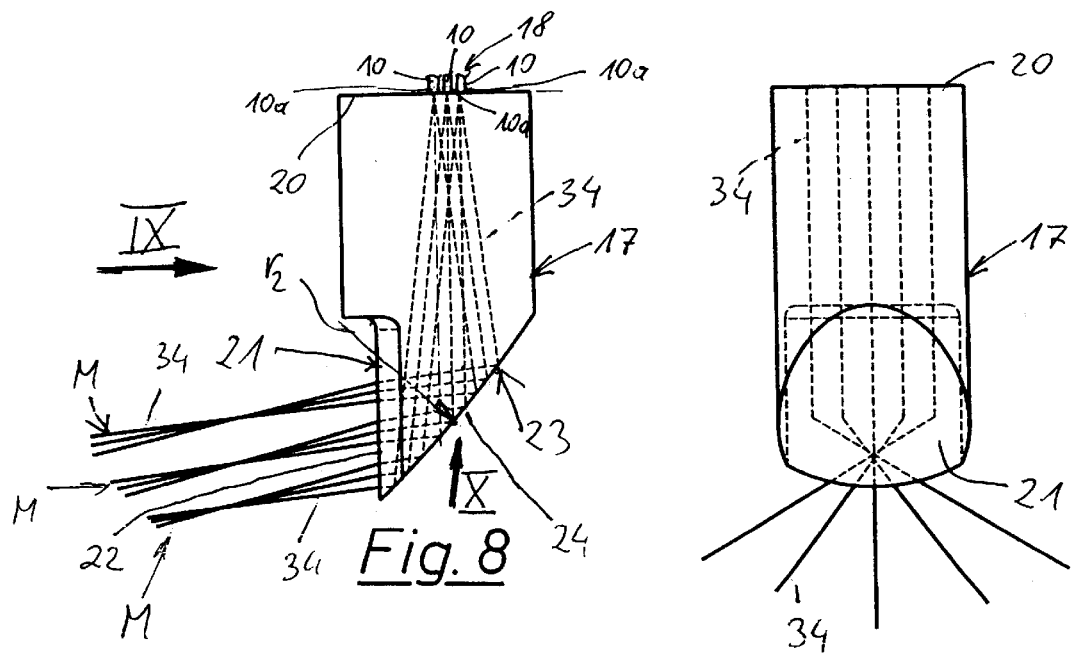
Fig. 8
Fig. 9
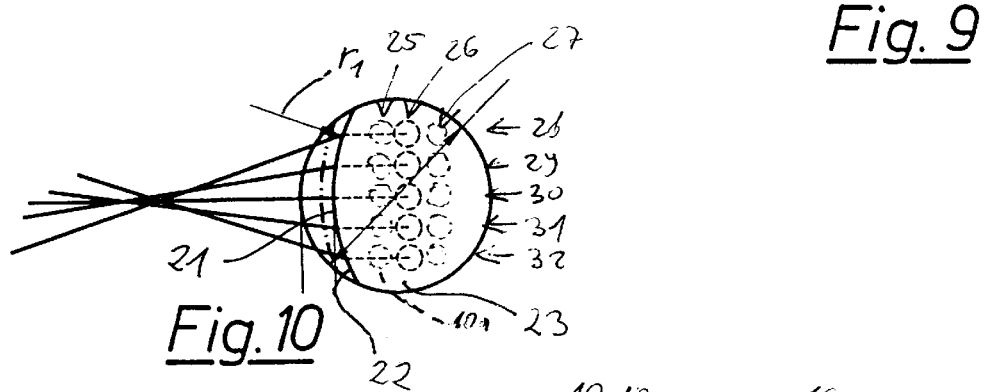
Fig. 10
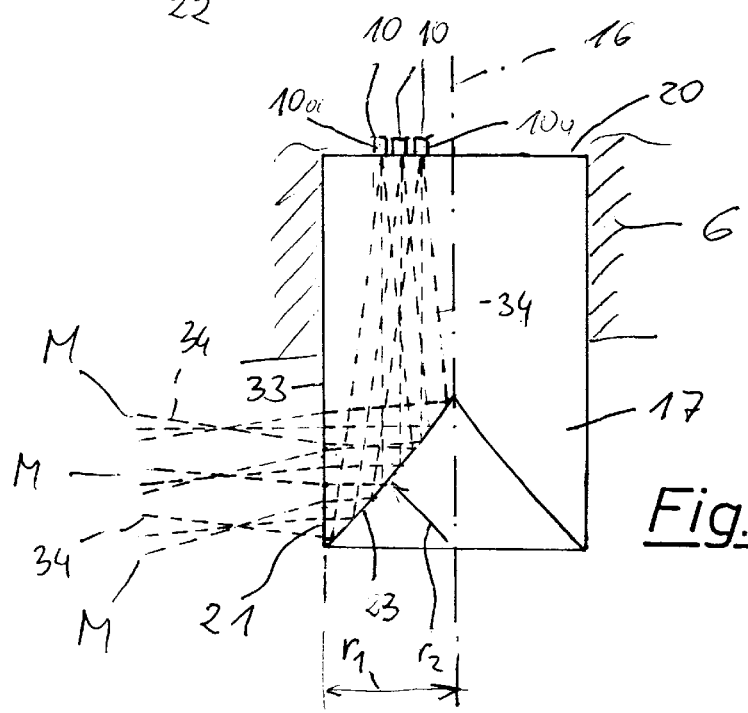
Fig. 11

OPTOELECTRONIC MEASURING DEVICE

BACKGROUND OF THE INVENTION

The invention relates to an optoelectronic measuring device for monitoring combustion processes in the combustion chamber of an internal combustion engine during operation, with optical sensors assigned to the combustion chamber, which are connected to an evaluation unit, the sensor ends on the side of the combustion chamber being essentially positioned in a plane and the sensors being aligned so that the individual viewing angles of the sensors will uniformly cover at least one predefined measuring sector of the combustion chamber.

DESCRIPTION OF PRIOR ART

For engine development it is of prime importance to understand t h e development of combustion processes in time and space. In EP 0 593 413 B1 an optoelectronic measuring device is described where the sensors are located in the cylinder head gasket of an internal combustion engine. In order to produce a two-dimensional image of the combustion processes the sensors are arranged such that their individual viewing angles will uniformly cover the area of the combustion chamber in the plane of the cylinder head gasket. The evaluation unit is provided with a computing unit which will process the signals of the individual sensors to compute brightness values for defined areas of the cylinder head gasket plane and convert them into a two-dimensional image. In this way measurements can be obtained without interfering with the engine or geometry of the combustion chamber. Since the sensors are integrated in the cylinder head gasket, a separate sensor-carrying cylinder head gasket is required for each engine. Another drawback is that the cylinder head must be removed whenever a cylinder head gasket is to be replaced by a sensor-carrying cylinder head gasket. For this reason optical measurement by means of a sensor-carrying cylinder head gasket is complex and cost-intensive.

U.S. Pat. No. 4,393,687 A is concerned with a sensor arrangement for determining oscillations arising upon knocking of a combustion engine, which includes one or more optical receivers in the combustion chamber, preferably configured as a glass rod or a lightguide cable of glass fibers. The optical receivers are either integrated in the spark plug, or connected to a pre-chamber, or inserted in the cylinder head gasket.

The spark plugs for combustion engines described in U.S. Pat. No. 4,446,723 A and U.S. Pat. No. 4,505,186 A are provided with a centrally positioned single lightguide. This will only permit simple measurements, however, such as determining whether or not engine knocking occurs. For the more complex measurements, such as monitoring the development of an inner flame cone or its movement, spark plugs with a single lightguide will not be sufficient.

From AT 002 228 U1 a spark plug is known which is provided with several lightguides ending in the combustion chamber, which permit complex measurements such as monitoring flame propagation, in addition to knock detection. In that instance the sensor ends are arranged in a ring on the end face of the spark plug facing the combustion chamber. This will allow monitoring of combustion phenomena only within a cylindrical or cone-shaped measuring area. Processes in the area of the top or at the periphery of the combustion chamber cannot be covered in this manner.

SUMMARY OF THE INVENTION

It is an object of this invention to overcome the disadvantages of known devices and to improve an optoelectronic measuring device of the above type in such a way that the costs of production and measuring will be reduced.

According to the invention this object is achieved by providing that the optical sensors be located in an essentially cylindrical component projecting into the combustion chamber and the sensor ends be located essentially radially along the wall of the component. The component carrying the optical sensors is screwed into the cylinder head via a bore for a functional part ending in the combustion chamber or a separate sensor bore. The component may be formed by a spark plug or an injector. In this case no further measuring bores will be required in the combustion chamber. The cylindrical wall could also be configured as a separate sensor part. The sensor ends located in the wall are directed into the combustion chamber more or less radially, resulting in an essentially plane or umbrella-shaped measuring sector.

As the optical sensors are located in the functional component no modifications of the engine will be necessary, and the operating range (speed and load) of the engine will not be restricted. The signals of the individual sensors can be converted into two-dimensional images by means of algorithms known from emission tomography, the resolution of the images being limited only by the number of sensors used. In a proven variant of the invention eight sensors are used per component. The measuring device of the invention will ensure prolonged tests of combustion processes with temporal and spatial resolution using standard electronic components.

It has proved to be of particular advantage if each optical sensor is provided with a deflector element at its end. The optical fibers of the sensors are guided towards the deflector element essentially in parallel with the longitudinal axis of the component. Due to the deflector element, the viewing direction of the optical fibers is deflected by 90° in radial direction, such that an area of the combustion chamber surrounding the wall of the component may be monitored. The deflector element can be configured as a mirror or prism, preferably a sapphire prism, and can be attached to the lower end of the optical fibers. According to a variant characterized by manufacturing ease, the deflector element is configured as a ring.

In further development of the invention each optical sensor is provided with a bundle of optical fibers. This permits full coverage of a measuring sector surrounding the cylindrical wall of the component. To increase spatial resolution, it is recommended to reduce the viewing angle of the optical fibers. This may be achieved by providing an aperture at the end of at least one optical fiber. Spatial resolution may also be achieved by means of self-focusing end faces of the glass fibers.

In an especially advantageous variant of the invention the end of at least one optical fiber is located in the focal plane of a lens to introduce more light into the fiber. It is also possible to arrange the ends of several lightguides in the focal plane of the lens, preferably in rows of five fibers, for example. The spatial resolution, especially in the direction of the circumference of the component, may be significantly increased by positioning at least one row of fiber ends essentially in a circular arc or tangent line relative to the component.

No separate lens will be required if the deflector element is configured as a lens. The deflector element could also exhibit a curved optical boundary surface with the combustion chamber, which should be configured as a lens, and preferably as a first cylinder lens. In this way each optical fiber can be assigned a certain viewing angle.

According to a preferred variant of the invention the deflector element exhibits a curved deflector surface configured as a lens, and preferably as a second cylinder lens. In this way a plurality of measuring sectors may be obtained one above the other in the direction of the longitudinal axis of the component, and the quality of measurement may be significantly improved. A plurality of measuring sectors in the direction of the longitudinal axis of the component could also be obtained by providing the deflector element with a deflector surface configured as section of a torus, the deflector element being preferably constituted by a sapphire pin. High-quality measuring results will be obtained if the curvature radius of the curved deflector surface is greater than that of the curved optical boundary surface.

In order to obtain a plurality of measuring sectors in a simple way it is of advantage if the ends of at least two optical fibers per sensor are placed at different distances from a mean longitudinal axis of the component. The fiber ends may be arranged in rows, preferably in at least two rows that are essentially parallel with each other. At least two rows could also be aligned orthogonally to each other. Spatial resolution in the direction of the longitudinal axis of the component is significantly increased by positioning at least one row of fiber ends essentially radially relative to the component.

The light rays arrive at the deflector element via the curved optical boundary surface, and are collimated by the first cylinder lens and reflected at the curved deflector surface. Due to the deflector surface configured as a second cylinder, lens rays from several measuring sectors are picked up and passed on at different reflection angles to the rows of fiber ends arranged in different tangential and radial alignments.

For conversion into two-dimensional images, a plurality of measuring devices is provided for each combustion chamber, which are preferably located inside separate components. Preferably, each measuring device exhibits at least forty directions of vision evenly distributed over the circumference. The measuring sectors of the individual components may partly overlap, or cover different areas of the combustion chamber, for example, different measuring planes.

The measuring device of the invention will enable the location of knocking combustion to be detected in a simple way, by evaluation of the light signals of the combustion process monitored. A single measuring device per cylinder will suffice for localization of the engine knock. As knocking, i.e., an uncontrolled self-ignition of spark-ignited fuels, may be interpreted as shock waves, which can be described in mathematical terms as spherical waves being a function of intensity distribution and propagation rate, a simple evaluation and computation is possible from which the origin of knocking combustion can be inferred. The shock wave of a knock will only be registered by the sensors when the wave front enters the measuring sector of the combustion chamber. From the values measured for the wave front by means of the optical sensors, the point of origin of the wave front may be inferred with the use of a mathematical model describing the shock wave.

It would further be possible to employ the optical measuring device together with a pressure sensor, and to use the difference in propagation time between sound wave and light wave to precisely determine the distance of the knocking location from the pressure sensor, and thus, in combination with the optical measurement, the original location of the engine knock.

BRIEF DESCRIPTION OF THE DRAWINGS

The invention will now be further described with reference to the accompanying drawings, in which FIG. 1 is a section through a cylinder of an internal combustion engine exhibiting a measuring device according to the invention, FIG. 2 is a section through the cylinder along line II—II in FIG. 1, FIG. 3 is an oblique view of the measuring device according to the invention, FIG. 4 is an oblique view of a spark plug provided with the optical sensors, FIG. 5 is a section through the spark plug along line V—V in FIG. 4, FIGS. 6 and 7 are longitudinal sections through the measuring device, FIG. 8 is an enlarged lateral view of a deflector element of the measuring device, FIG. 9 is a view of the deflector element along arrow IX—IX in FIG. 8, FIG. 10 is a view of the deflector element along arrow X—X in FIG. 8, FIG. 11 is a longitudinal section through a further variant of a deflector element of a measuring device.

DETAILED DESCRIPTION OF THE PREFERRED EMBODIMENTS

FIG. 1 is a section through a cylinder 1 of an internal combustion engine with a reciprocating piston 2. The cylinder 1 is covered by a cylinder head 3 containing an optoelectronic measuring device 4 for monitoring combustion processes in the combustion chamber 5. The measuring device 4 includes a plurality of optical sensors 7 provided in a cylindrical component 6, the sensor ends 8 being optically connected to the combustion chamber 5. Each optical sensor 7 has a light guide 9 comprising at least one optical fiber 10. The light guide 9 may comprise a whole bundle 18 of optical fibers 10, as shown in FIG. 5. Each light guide 9 leads to a connection 11 for a light guide cable 12.

The essentially cylindrical component 6, which is constituted by a spark plug in the embodiment shown, is screwed into a bore 13 of the cylinder head 3 opening into the combustion chamber 5. The sensor ends 8 of each sensor 7 are located in an area of the wall 14 of the component 6, so that the viewing angles β of the individual sensors 7, or rather, the viewing angles a of the individual optical fibers 10, will uniformly cover a measuring sector M of the combustion chamber 5. The measuring sector M is essentially located in a plane 15 normal to the longitudinal axis 16 of the component 6. In the embodiment shown the measuring device 4 has a total of forty directions of vision. With one measuring device 4 per cylinder 1, it will be possible to detect the location of engine knocking. In order to produce two-dimensional images of the combustion phenomenon, several measuring devices 4 will be required for each cylinder 1, for example three measuring devices 4 with forty directions of vision each.

In the area of each sensor end 8 a deflector element 17 is provided in the component 6, which will deflect the viewing direction of the optical fibers 10 by an angle α of about 90°. The deflector element 17 may be configured as a mirror or prism, preferably a sapphire prism. A simple way of manufacturing the device is obtained by configuring the deflector element 17 as a ring which is fastened to the cylindrical wall 14 of the component 6. The deflector element 17 permits radially arriving light rays to be deflected into the light guides 9 of the sensor 7 which are running in parallel with the longitudinal axis 16 of the component 6.

To increase spatial resolution of the optical fibers 10, their viewing angle must be restricted. This may be achieved by providing an aperture between optical fiber end and deflector element. It would also be possible to provide the optical fibers with self-focusing ends for the purpose of increasing spatial resolution.

A particularly high resolution is obtained by providing that the optical fibers 10 end in the focal plane 20 of a lens. In this context the ends 10a of several optical fibers 10 may be located in the focal plane 20 of a lens. For example, if the optical fibers 10 of an optical fiber bundle 18 of a light guide 9 are arranged in a row of, say, five fibers, spatial resolution will be considerably increased.

Instead of an additional lens between the optical fibers 10 and the deflector element 17, the deflector element 17 itself may be configured as a lens.

In the embodiment shown in FIG. 1 the measuring sector M is located in a plane 15. If the deflection angle α is greater or smaller than 90°, the measuring sector M is formed by an umbrella-like area in the shape of an envelope of cone (indicated by broken lines in FIG. 1), which will also permit localization of the combustion phenomena.

FIGS. 8 to 10 show a deflector element 17 which is essentially formed by a cylindrical sapphire pin configured as a lens. The optical boundary surface 21 with the combustion chamber 5 is configured as a first cylinder lens 22 with a radius $r_1$.

The deflector element 17 is further provided with a curved deflector surface 23 configured as a second cylinder lens 24. The ends 10a of the optical fibers 10 are aligned in rows, at least two rows 25, 26, 27 being arranged in parallel with each other and essentially at a tangent relative to the component 6. The ends 10a of the optical fibers 10 of rows 25, 26, 27 thus have different distances from the mean longitudinal axis 16 of the component 6. Due to the curved deflector surface 23 configured as a second cylinder lens 24 the measuring region will be significantly enlarged in the direction of the longitudinal axis 16 of the component 6, and several umbrella-shaped measuring sectors M will be obtained which are arranged one on top of the other. As the ends 10a are arranged in several parallel rows 28, 29, 30, 31, 32 in tangential direction as well, precise spatial resolution will be achieved. The radius $r_1$ of the first cylinder lens 22 should be smaller than the radius $r_2$ of the second cylinder lens 24.

The deflector elements 17 constituted by sapphire pins according to FIGS. 8 to 10 are uniformly distributed over the circumference of component 6.

Instead of a plurality of deflector elements 17 distributed over the circumference of component 6, a single deflector element 17 constituted by a sapphire pin may be provided in component 6 in a central position, as is shown in FIG. 11. The deflector surface 23 of the deflector element 17 is configured as section of a torus, so that an annular array of optical fibers 10 will also permit the monitoring of combustion phenomena in several umbrella-shaped measuring sectors M placed one above the other. The optical boundary surface 21 with its curvature radius $r_1$ is formed in this instance by the exterior wall 33 of the cylindrical deflector element 17. The radius $r_1$ of the boundary surface 21 is smaller than the radius $r_2$ of the deflector surface 23.

The light rays 34 inside the measuring sectors M will enter the deflector element 17 via the curved optical boundary surface 21, and will be collimated by the boundary surface 21 acting as a lens, and reflected at the curved deflector surface 23. Due to the deflector surface 23 light rays 34 from several measuring sectors M will be picked up and passed on at different reflexion angles to the rows of fiber ends 10a of the optical fibers 10, which are arranged in a circular arc or in differing tangential and radial alignments.

As soon as a pressure wave caused by knocking and the resulting change in light intensity will arrive at the measuring sector M, a number of sensors 7 will detect intensity changes in the combustion chamber 5 as a sequence in time and pass on the measured values to an evaluation unit not shown in detail. Due to the shift in time between the individual values the evaluation unit will calculate the point of origin of the wave front using a mathematical model describing the shock wave, the measured values being cross-correlated with fictitious wave fronts stored in a data base. The number of sensors 7 and required measuring channels may thus be kept very small. In the variant shown the component 6 is provided with eight sensors 7, each with an optical fiber bundle 18 comprising five optical fibers 10.

What is claimed is:

1. An optoelectronic measuring device for monitoring combustion processes in a combustion chamber of an internal combustion engine during operation, said optoelectric measuring device comprising optical sensors which are connected to an evaluation unit, ends of said sensors on a side of the combustion chamber being essentially positioned in a plane and the sensors being aligned so that individual viewing angles of the sensors will uniformly cover at least one predefined measuring sector of the combustion chamber, wherein the optical sensors are located in an essentially cylindrical component which is extendable into the combustion chamber and the sensor ends are located essentially radially and in communication with a side wall of the component and wherein each optical sensor is provided with a deflector element at the sensor end.

2. The measuring device according to claim 1, wherein the measuring sector is essentially plane.

3. The measuring device according to claim 1, wherein the measuring sector is umbrella-shaped.

4. The measuring device according to claim 1 wherein the deflector element is configured as a mirror.

5. The measuring device according to claim 1, wherein the deflector element is configured as a prism.

6. The measuring device according to claim 5, wherein the deflector element is configured as a sapphire prism.

7. The measuring device according to claim 1, wherein the deflector element is configured as a ring.

8. The measuring device according to claim 1, wherein the deflector element has a plane deflector surface.

9. The measuring device according to claim 1, each sensor comprising a lightguide with a least one optical fiber, wherein each optical sensor comprises a bundle of optical fibers.

10. The measuring device according to claim 9, wherein the ends of at least two optical fibers per sensor are placed at different distances from a mean longitudinal axis of the component.

11. The measuring device according to claim 9, wherein the ends of the optical fibers are essentially arranged in rows.

12. The measuring device according to claim 9, wherein the ends of the optical fibers are arranged in at least two rows that are essentially aligned orthogonally to each other.

13. The measuring device according to claim 9, wherein the ends of the optical fibers are arranged in at least two rows that are essentially parallel with each other.

14. The measuring device according to claim 11, wherein at least one row of the ends of the optical fibers is positioned essentially in a circular arc.

15. The measuring device according to claim 11, wherein at least one row of the ends of the optical fibers is positioned essentially in a tangent line relative to the component.

16. The measuring device according to claim 11, wherein at least one row of the ends of the optical fibers is positioned essentially radially relative to the component.

17. The measuring device according to claim 1, wherein an aperture is provided at the end of at least one optical fiber.

18. The measuring device according to claim 1, wherein at least one optical fiber is provided with a self-focusing end face.

19. The measuring device according to claim 1, wherein the end of at least one optical fiber is provided in a focal plane of a lens.

20. The measuring device according to claim 19, wherein the ends of a plurality of optical fibers are provided in the focal plane of the lens.

21. The measuring device according to claim 20, wherein the ends of all optical fibers of a lightguide are provided in the focal plane of the lens.

22. The measuring device according to claim 1, wherein deflector element is configured as a lens.

23. The measuring device according to claim 22, wherein the deflector element exhibits a curved optical boundary surface with the combustion chamber, which is configured as an optical lens.

24. The measuring device according to claim 22, wherein the boundary surface is configured as a first cylinder lens.

25. The measuring device according to claim 22, wherein the deflector element exhibits a curved deflector surface, which is configured as an optical lens.

26. The measuring device according to claim 25, wherein the deflector surface is configured as a second cylinder lens.

27. The measuring device according to claim 1, wherein the deflector element has a deflector surface which is configured as section of a torus.

28. The measuring device according to claim 25, wherein the curved deflector surface has a curvature radius that is greater than that of the curved optical boundary surface.

29. The measuring device according to claim 1, wherein in a direction of a longitudinal axis of the component several measuring sectors are arranged one on top of the other.

30. The measuring device according to claim 21, wherein the deflector element is configured as a sapphire pin.

31. The measuring device according to claim 1, wherein the component is configured as a spark plug.

32. The measuring device according to claim 1, wherein the component is configured as an injector.

33. The measuring device according to claim 1, wherein a plurality of measuring devices are provided for each combustion chamber, which are located inside separate components.

34. The measuring device according to claim 1, wherein the measuring device exhibits at least forty directions of vision evenly distributed over the circum-ference.

35. An optoelectronic measuring device for monitoring combustion processes in a combustion chamber of an internal combustion engine during operation, comprising optical sensors which are connected to an evaluation unit, ends of said sensors on a side of the combustion chamber being essentially positioned in a plane and the sensors being aligned so that individual viewing angles of the sensors will uniformly cover at least one predefined measuring sector of the combustion chamber, wherein the optical sensors are located in an essentially cylindrical component which is extendable into the combustion chamber and the sensor ends are located essentially radially and in communication with a side wall of the component, and wherein each optical sensor is provided with a deflector element at the sensor end, each deflector element comprising a lens.

* * * * *